United States Patent [19]

Compton

[11] Patent Number: 4,939,874
[45] Date of Patent: Jul. 10, 1990

[54] STACK CAP COVERING SYSTEM

[76] Inventor: Roy C. Compton, 1833 J and 610 Rd., Fruita, Colo. 81521

[21] Appl. No.: 758,884

[22] Filed: Jul. 25, 1985

[51] Int. Cl.⁵ .............................. E04D 1/34; B66F 9/00
[52] U.S. Cl. ................................................ 52/4; 52/3; 294/19.1; 414/724
[58] Field of Search ..................... 52/3, 4, 5; 294/19.1; 414/132, 10, 12, 724

[56] References Cited

U.S. PATENT DOCUMENTS

| | | | |
|---|---|---|---|
| 38,547 | 5/1863 | Bickhart . | |
| 80,301 | 7/1868 | Munson . | |
| 140,127 | 6/1873 | Fitzgerald | 52/5 |
| 181,518 | 8/1876 | Bollman | 52/4 |
| 194,455 | 8/1877 | Montgomery | 52/4 |
| 265,003 | 9/1882 | Bean | 52/3 |
| 323,638 | 8/1885 | Cooley | 52/3 |
| 356,838 | 2/1887 | Hutchison | 52/3 |
| 508,110 | 11/1893 | Jehle et al. | 52/3 |
| 715,603 | 12/1902 | Quarrie et al. . | |
| 1,061,547 | 5/1913 | Kennedy et al. . | |
| 3,000,139 | 9/1961 | Bezzerides . | |
| 3,162,920 | 12/1964 | Durham . | |
| 3,172,740 | 3/1965 | Elstner | 52/3 |
| 3,327,434 | 6/1967 | Martin . | |
| 3,421,642 | 1/1969 | Carter | 414/724 |
| 3,587,887 | 6/1971 | DeCarli | 414/724 |
| 4,019,769 | 4/1977 | Filion | 294/19.1 |
| 4,041,654 | 8/1977 | Nedila . | |
| 4,197,673 | 4/1980 | Thomas . | |

FOREIGN PATENT DOCUMENTS

| | | | |
|---|---|---|---|
| 123851 | 12/1904 | Fed. Rep. of Germany | 52/4 |
| 581534 | 12/1924 | France | 52/4 |
| 6331 | of 1894 | United Kingdom | 52/3 |
| 637479 | 5/1950 | United Kingdom | 52/4 |

Primary Examiner—Michael Safavi
Attorney, Agent, or Firm—William P. O'Meara

[57] ABSTRACT

A stack cap for protecting stacked field crops such as hay from moisture comprising: roof structure for covering an upper portion of a stack; roof mounting structure for supporting the roof structure on a stack in spaced apart relationship therefrom whereby ventilation of the upper portion of the stack is permitted; securing means for securing the roof structure to a stack; stack mounting apparatus for raising the roof structure onto a stack; and alternate support structure for selectively supporting an end portion of the roof structure above a removed portion of a covered stack. Methods for mounting the stack cap on a stack and interconnection of a plurality of stack caps are described.

7 Claims, 6 Drawing Sheets

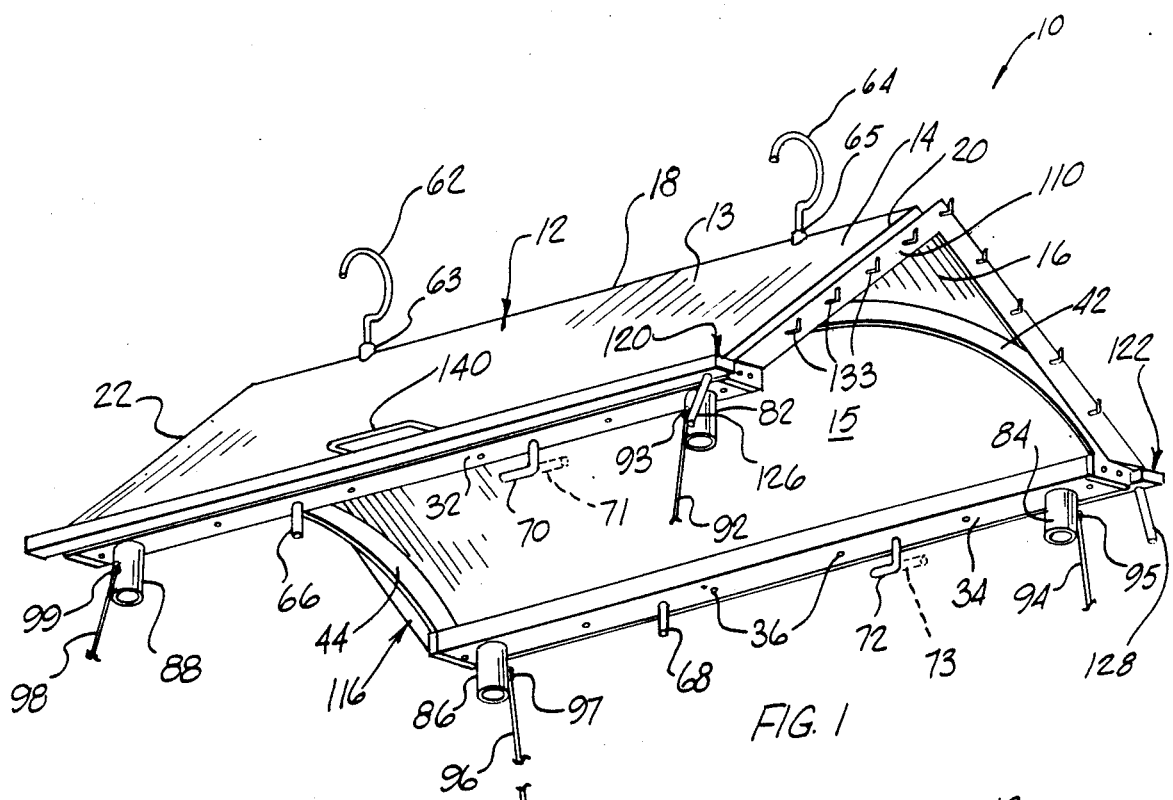
FIG. 1
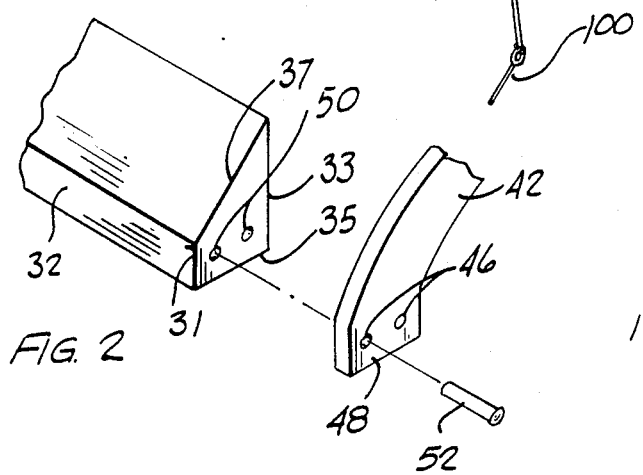
FIG. 2
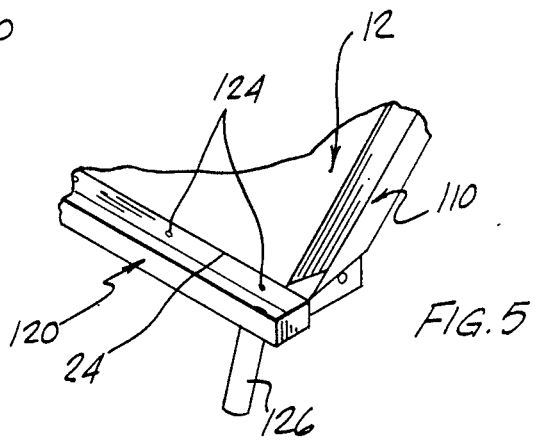
FIG. 5
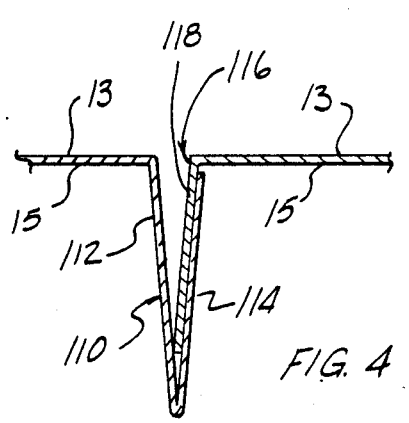
FIG. 4
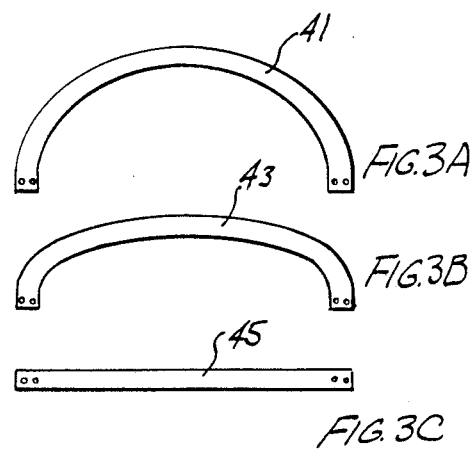
FIG. 3A
FIG. 3B
FIG. 3C U.S. Patent  Jul. 10, 1990  Sheet 4 of 6  4,939,874

STACK CAP COVERING SYSTEM

BACKGROUND OF THE INVENTION

The present invention relates generally to agricultural crop storage and, more particularly, to a stack cap covering system for protecting stacked feed crops such as hay from moisture.

In the past, farmers and livestock producers simply took for granted that part of the hay or other roughage crop that they were buying, feeding or selling would be molded, leached, blackened or otherwise made unfit for feeding due to moisture. Recently, the value and expense of such crops have led farmers to attempt various solutions to the moisture problem.

A few years ago, when most bales were hand stacked, the tops of the stacks were sometimes constructed in a pyramid shape to lock out moisture. This eliminated the excessive moisture losses associated with a flat topped stack, however, each bale that even partially protruded from the pyramid would have considerable damage.

More recently, farmers have placed plastic tarps, canvas, plywood or other sheeting, or the previous year's ruined bales on top of their stacks. All of these attempts at reducing moisture damage have had serious drawbacks. Such covering systems have tended to be expensive, labor intensive and generally ineffective in that air circulation to the hay is restricted. In many cases, this poor circulation ruins more hay than the covering system protects. Hay storage sheds or barns have been used to cover part of the crop. However, such structures are expensive, have limited capacity and usually require hand labor to fill.

Presently, most farmers and feeders prefer a roughage crop that requires little or no manual handling. The crop must also be high in total digestable nutrients; cost efficient to sell or use; and mold and dust free. Such crops are treated with selective herbicide, conditioned mechanically and chemically during processing, stacked by machines and, in medium to large scale operations, such crops are fed to livestock by machinery.

Nowdays stacking of bales is usually done outdoors as most buildings are not large enough to accomodate the handling the machinery or the volume of hay produced or used. The machinery used make compact stable stacks and if the hay is covered properly, the use of such machinery provides an extremely effective method of storing this valuable necessity of livestock feeding.

A need exists to provide a relatively inexpensive means for protecting stacked hay and the like from moisture in a manner which will provide air circulation around the hay and which will not interfere with the use of large hay handling machinery.

OBJECTS OF THE INVENTION

It is an object of the invention to provide a stack covering system which protects crop stacks from the weather while providing circulation around the entire stack.

It is another object of the invention to provide a stack covering system which is lightweight and which may be quickly placed on or removed from a stack by one man using a mechanical loader or two men using a manual pole system.

It is another object of the invention to provide a stack covering system which is inexpensive and sufficiently durable for many years of use.

It is another object of the invention to provide a stack covering system which is constructed from material which is heat and cold resistant to enable use of the system in all temperature conditions.

It is another object of the invention to provide a stack covering system which comprises units which may be easily stacked for storage when not in use or which may be anchored to the stack yard ground to protect the yard from moisture to thereby provide a dry and clean stack yard surface.

It is another object of the invention to provide a stack covering system which when properly applied and anchored, is secure and intact in severe weather.

It is another object of the invention to provide a stack covering system which has a cap constructed and arranged such that the cap overhang is positioned close to the stack to provide a minimum of wind catching surface.

It is another object of the invention to provide a stack covering system which has optional wind wings on the ends to provide coverage at the open ends of the stack cap.

It is another object of the invention to provide a stack covering system which has a cap with pole receptacles on either end in order that the cap may be left in place while bales are removed from the stack without exposing the remaining stack to the weather.

It is another object of the invention to provide a stack covering system which has units in varying sizes with variable shaped cross member to allow units to be placed on different sized bale stacks and stacks having different shaped tops.

It is another object of the invention to provide a stack covering system which when used with appropriate clamps and/or tie downs, may serve as a roof system for small enclosures, corrals, growing pens or anything which may require cover for weather protection.

It is another object of the invention to provide a stack covering system which has optional rain gutter clamps for applying a gutter system to take moisture away from stack areas.

It is another object of the invention to provide a portable stack covering system which may be used at any location in order that stacks may be placed wherever desired as feeding operations change to thereby obviate the need for moving of feed from sheds or barns to feed lots.

SUMMARY OF THE INVENTION

The present invention comprises a method and apparatus for protecting stacked field crops such as hay from moisture damage. The invention includes a roof having a generally inverted V-shaped configuration which is supported on top of a stack to be covered by transversely extending members attached to lower portions of the roof. In a preferred embodiment, these transversely extending members are arcuate and downwardly concave in shape and have a radius of curvature smaller than the radius of curvature of a hay stack or the like on which the cap is to be mounted. Such a configuration enables each cross member to be supported at at least two points on the hay stack, thus insuring a stable mounting configuration. The mounting configuration of the transverse members on the roof is also such as to insure that the roof will be positioned in spaced apart relationship from the upper surface of the hay stack thus allowing air circulation around the hay stack. The roof structure or "cap" may be secured to the hay stack by lines secured to the four corners of the cap and attached to anchoring means such as spike devices which are, in turn, either inserted directly into a lower portion of the hay stack or, alternately, driven into the ground near the hay stack. Receptacles may be provided on the stack cap to enable the cap to be engaged by elongate, preferably telescoping, mounting poles enabling two men to lift the cap onto the hay stack using the mounting poles. The cap may also be provided with a pair of hooks at the upper surface thereof to enable the cap to be engaged by a bracket assembly mounted on a pivotable bucket assembly of a front end loader or the like and thereby enabling a single man using the loader to mount a cap on or remove a cap from a hay stack. Receptacles are provided at the four corners of the stack cap enabling it to be supported at either end by support poles in place of the support ordinarily provided by a transverse member resting on the stack. Using the support poles, hay may be removed from below one end of the stack cap thus allowing a farmer to feed livestock from a hay stack while still allowing the stack to remain covered by the cap. Rain gutters and wind wings may be provided on the roof structure to control roof rain runoff and wind loading.

Thus, it may be seen that the invention may comprise a stack cap for protecting stacked field crops such as hay from moisture comprising roof means for covering an upper portion of a stack, roof mounting means for supporting the roof means on a stack in spaced apart relationship therefrom whereby ventilation of the upper portion of the stack is permitted, securing means for securing said roof means to a stack, stack mounting means for raising said roof means onto a stack and alternate support means for selectively supporting an end portion of said roof means above a removed portion of a covered stack.

The invention may also comprise a covering system for protecting stacked field crops such as hay from moisture comprising an inverted V-shaped roof structure including a pair of generally planar roof panels integrally connected along a longitudinally extending roof peak line defining the top of said roof structure; said roof structure having an inverted V-shaped front edge, an inverted V-shaped back edge and a pair of parallel longitudinally extending side edges terminating in four roof corners and defining the bottom of said roof structure; said roof structure having an exterior surface and an interior surface; a first, V-shaped, lip portion mounted on said front edge of said roof structure and being substantially co-extensive therewith and a second, downwardly extending, lip portion mounted on said back edge of said roof structure and being substantially co-extensive therewith, said first lip portion being adapted to interlock with structure on an adjacently positioned roof structure which is substantially identical to said second lip portion for forming a watertight seal therewith; a first transversely extending beam selectively removably attached to laterally opposite lower portions of said first and second roof panels proximate said front edge of said roof structure and a second transversely extending beam selectively removably attached to laterally opposite lower portions of said first and second roof panels proximate said back edge of said roof structure; said first and second transversely extending beams being of substantially identical size and shape and being of an arcuate, downwardly concave configuration having a radius of curvature at least as small as the associated radius of curvature of the upper portion of a stack to be covered; a pair of parallel longitudinally extending beams fixedly attached to opposite lower, interior portions of said first and second roof panels and connectable at end portions thereof with end portions of said transversely extending beams; a first pair of mounting pole receiving receptacles mounted on one of said longitudinally extending beams at an intermediate portion thereof and a second pair of mounting pole receiving receptacles mounted on the other of said longitudinally extending beams at an intermediate portion thereof; each pair of receptacles having a first generally longitudinally extending opening and a second generally vertically extending opening therein adapted to slidingly and pivotally engagably accept a longitudinally extending prong portion and a vertically extending prong portion of a mounting pole; at least two downwardly opening roof hooks mounted on an upper portion of said roof structure and adapted to selectively engage and disengage from an elongate raising bar portion of a front end loader mountable bracket structure; end support pole sockets provided proximate said four corner portions of said roof structure for selectively receiving support poles therein; tie down assemblies comprising individual lines attached proximate said four corners of said roof structure and anchor devices securable to the stack and attached to terminal end portions of said lines; laterally extending handles mounted proximate the longitudinal centers of said side edges of said roof structure whereby said roof structure is hand carriable by two men using said handles and is storingly securable to the ground using ground anchor devices driven into the ground and engaging said handles; gutter assemblies selectively mountable on said side edges of said roof structure and adapted to carry rain water away from an associated stack of crops; wind wings selectively attachable proximate said front and back edges of said roof structure in downwardly extending relationship therefrom and being of a vertical dimension substantially as great as the vertical dimension of the stack cap; telescopingly extendable and lockable mounting poles adapted to be engaged by said mounting pole receiving receptacles; said roof structure being engagable by a pair of said mounting poles, raisable onto a stack with said mounting poles and disengagable from said mounting poles, by selected pivotal movements of said mounting poles; telescopingly extendable and lockable support poles receivable in said end support pole sockets for supporting one end portion of said roof structure when a portion of a covered stack is removed from below one transversely extending beam of said roof structure; a front end loader mountable bracket assembly adapted to be received by said downwardly opening roof hooks whereby said roof structure is engagable and raisable or lowerable with respect to a stack through selected pivotal movement of a bucket assembly of a front end loader on which said bracket assembly is mounted; said bracket assembly having a substantially straight relatively long arm portion for providing a relatively large vertical displacement of said roof structure in response to pivotal movement of the bucket assembly and having a roof hook engagement portion for engaging the roof hooks and having a relief bend portion between said hook engagement portion and said arm portion for providing clearance between said bracket assembly and said roof structure as said roof structure is raised by said bracket assembly.

The invention may also comprise a method of covering a field crop stack comprising the steps of storing the stack cap by attaching the stack cap to the ground with anchor spikes engaged through laterally extending handle portions thereof; disengaging the anchor spikes from the handle portions; manually transporting the stack cap over a distance supporting the stack cap by the lateral handle portions; engaging laterally opposite lower portions of the stack cap with a pair of elongate mounting poles; simultaneously pivoting both poles upwardly substantially about a common horizontal pivot axis associated with the lower portions of both poles until the poles are in a substantially vertical orientation; displacing both poles in a horizontal direction to a position whereat the stack cap is directly above a portion of a crop stack to be covered; lowering both poles until the stack cap comes to rest on the stack; disengaging both poles from the stack cap; securing the stack cap to the stack; mounting a second stack cap on the stack with an open back portion of the first cap in adjacent relationship to an open front portion of the second cap; sealingly connecting said front and back edges of the two caps so as to provide a continuous enclosure over the stack; hanging downwardly extending coverings from edge portions of the stack cap so as to enclose associated open end surfaces of the stack cap with the downwardly extending coverings; mounting gutters about peripheral edges of the stack cap and deflecting water received by the gutters to a position removed from the stack.

The invention may also comprise a method of mounting a stack cap on top a crop stack comprising the steps of mounting an elongate bracket arm having a transversely extending member at the terminal end thereof on a pivotal bucket assembly of a front end loader; moving the transverse member below hook portions mounted at the top of the stack cap; raising the stack cap through pivotal movement of the bucket assembly; moving the front end loader to a position whereat the stack cap is above a selected portion of a stack to be covered; lowering the stack cap onto the surface of the stack through pivotal movement of the bucket assembly and disengaging the transverse member from the stack cap hooks through further pivotal movement of the bucket assembly.

BRIEF DESCRIPTION OF THE DRAWING

FIG. 1 is a perspective view of a stack cap.

FIG. 2 is an exploded, detail perspective view of portions of longitudinal and transverse structural members of a stack cap the type illustrated in FIG. 1.

FIGS. 3A, 3B and 3C are three alternate, transverse members for use on a stack cap of the type illustrated in FIG. 1.

FIG. 4 is a detail, cross-sectional view of interlocking lip portions of stack caps of the type illustrated in FIG. 1.

FIG. 5 is a detail perspective view of the rain gutter mounting on the stack cap of FIG. 1.

DETAILED DESCRIPTION OF THE INVENTION

Figure 6:
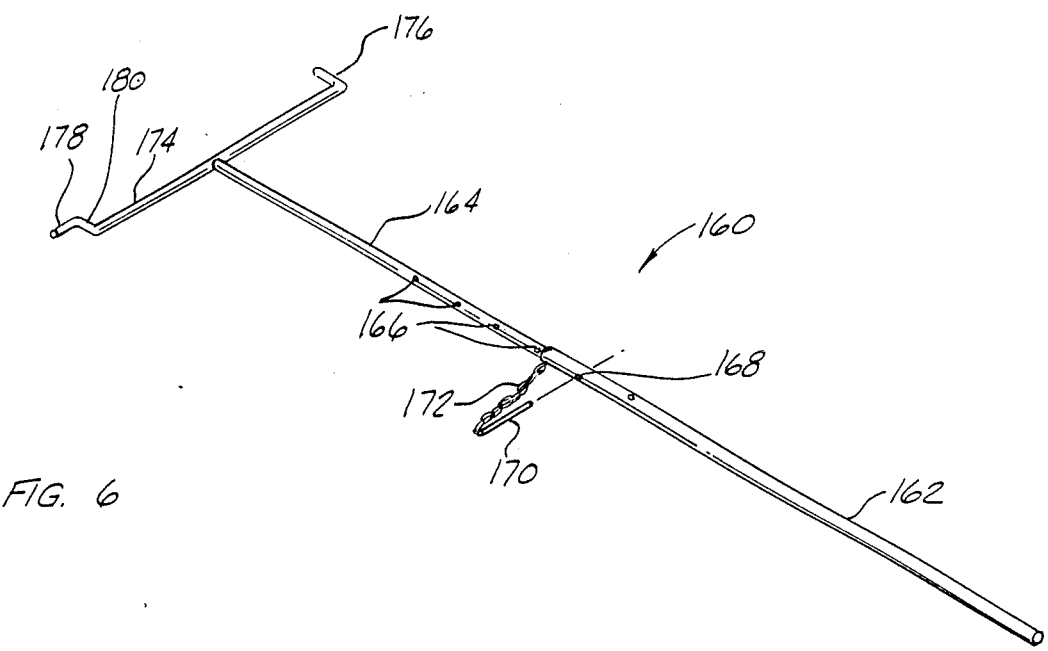
FIG. 6 is a perspective view of a telescoping mounting pole for hand mounting of a stack cap of the type illustrated in FIG. 1, on top a crop stack.

In general, as shown in FIG. 1, the stack cap 10 of the present invention comprises roof means such as roof structure 12 for protecting the upper portion of a stack 11, FIGS. 11-14, from exposure to rain and snow. The roof structure 12 is preferably of an inverted V-shaped cross-section and is provided with roof mounting means such as forward and rear transverse members 42, 44 which supports the roof structure in spaced apart relationship, FIG. 18, from the upper portion of a stack 11 to allow free air circulation to the upper portion of the stack. The roof mounting means are preferably disconnectable from the roof structure to enable a plurality of roof structures to be stacked one on top the other in a compact, storing or shipping configuration. Crop stack mounting means are provided for raising the stack cap 10 onto a stack to be covered and may comprise a pair of hooks 62, 64 mounted on an upper portion of the stack cap which are adapted to be engaged by a bracket assemble 190 mounted in a bucket assembly 270 of a front end loader 272, FIGS. 7 and 15-17. Securing means such as lines 92, 94, 96, 98 and associated anchor stakes 100 are provided for holding the stack cap in place after it has been mounted on top a stack 11, FIGS. 1 and 12-14. Alternate support means such as downwardly extending support sockets 82, 84, 86, 88 mounted at corner portions of the roof structure 12 and associated support members such as telescoping poles 230, 232 enable an end portion of a stack cap to remain stably supported after a portion of the stack is removed from below the stack cap, FIG. 14. Cap connecting means such as V-shaped lip 110 mounted at the front edge 20 of the stack cap and downwardly extending flange lip 112 mounted at the back edge 22 of a stack cap are adapted to sealingly interconnect with opposite front and back edge lips of associated stack caps in order to form a continuous sealed cover when a plurality of stack caps are mounted in adjacent relationship, FIGS. 1, 4 and 13. Gutter means such as first and second longitudinally extending gutter channels 120, 122 may be fixedly or removably mounted along the edge of a stack cap to collect water running off the roof structure 12 and may additionally be provided with spouts 126, 128 for directing runoff water away from an associated stack. Wind deflecting means such as wind wing members 130 (only one shown), FIG. 13, may be removably mounted on front and back edge portions 20, 22 to reduce wind loading on the stack cap in particularly windy areas. Having thus described the stack cap covering system of the present invention, in general, the various components of the invention will now be described in further detail.

Figure 11:
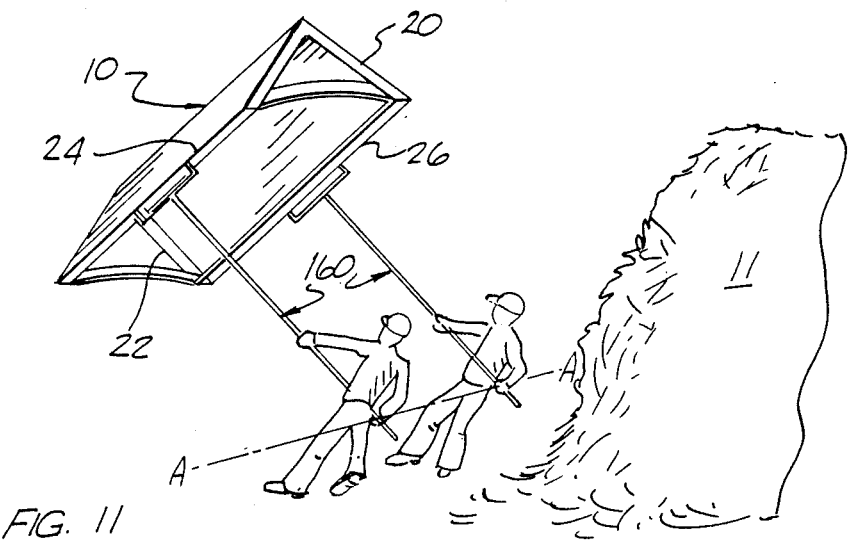
FIG. 11 is a schematic illustration showing the raising of a stack cap by two workers using telescoping mounting poles.

In one preferred embodiment, illustrated in FIG. 1, the stack cap 10 of the present invention comprises a roof structure 12 having an inverted V-shaped cross-section formed from a first roof panel 14 and a second roof panel 16 sealingly connected along a roof peak line 18 and defining an exterior surface 13 and an interior surface 15 which terminate at an inverted V-shaped front edge 20, an inverted V-shaped back edge 22 and longitudinally extending parallel side edges 24, 26, FIG. 11. The roof structure 12 is preferably made from a waterproof or highly water resistant material of sufficient strength and durability for years of continuous exposure to severe weather. The roof material is preferably sufficiently light to enable hand mounting of the roof structure. In one embodiment, the roof material comprises a plastic material such as extruded PET plastic. The roof structure may also comprise fiberglass, sheet metal, treated natural woven fabric such as canvas, or high strength synthetic fabric materials such as tear resistant nylon or the like. In one preferred embodiment, the amount of slope of the roof is between 20 degrees and 45 degrees. The amount of horizontal overhang of the roof structure is preferably between one and two feet and the amount of vertical space between the roof structure and the top of the stack, as described in further detail below, is preferably between one foot and three feet. Typical roof dimensions are ten feet in length, eight feet in width and three feet in height. In order to facilitate mounting of various other structural components on the roof structure 12, first and second parallel, longitudinally extending beams 32, 34 may be mounted on the roof interior surface 15 adjacent longitudinal side edges 24, 26. In a preferred embodiment, the beams 32, 34 have a trapezoidal cross-section with two parallel, vertically extending edges 31, 33, a lower horizontally extending edge 35 and an upper inclined edge 37 having the same slope as an associated portion of the roof structure 12. The beams may be attached to the roof structure by conventional mounting methods such as bolt fasteners 36 or other conventional mounting means well known in the art. The beams may be constructed of wood, metal or other suitable high strength material.

Roof mounting means such as forward and rear transverse members 42, 44 are adapted to provide a selected amount of spacing between the interior surface 15 of the roof structure 12 and the upper surface of an associated crop stack 11. It has been found that a relatively large radius of curvature, e.g. five feet, downwardly concave arcuate member enables a stack cap 10 to be stably mounted on most conventional hay stack configurations. The radius of curvature of the members 42, 44 are preferably identical for any given stack cap and are preferably less than or equal to the cross-sectional radius of curvature at the upper portion of a hay stack, thereby enabling each transverse member to engage the upper portion of the stack in at least two areas. However, transverse members having different radius of curvature such as a member 41 having a radius of approximately five feet, FIG. 3A, a member 43 having a radius of approximately four feet, FIG. 3B, and a member 45 having a straight line configuration, FIG. 3C, may be used to accomodate different stack sizes and shapes. The forward and rear transverse members 42, 44 are preferably removably mounted on the stack cap to enable a plurality of roof structures 12 to be stacked one on top the other in a tightly compact configuration, e.g. with adjacent surfaces of the roof structures positioned less than two inches apart. As illustrated in FIG. 2, the transverse members 42, 44 may be removably mounted on the stack cap as through pin holes 46 positioned at a terminal end portion 48 of a transverse member which are alignable with holes 50 in a terminal end portion of an associated longitudinal member and which are removably connectable as by pins 52 (only one shown). By selecting an appropriate arcuate shape, 41, 43, 45, etc. the distance between the top of a stack 11 and the interior surface 15 of a roof structure may be precisely selected to provide sufficient clearance for circulation without being spaced so far from the stack so as to create excessive interior wind loading.

Stack mounting means for use in the mechanical mounting of a cap stack 10 on top a hay stack 11 may comprise a pair of longitudinally spaced apart cap hooks 62, 64 mounted at the peak 18 of the roof structure 12. The use of the cap hooks with an associated loader mounted bracket assembly are discussed in detail below. The hooks 62, 64 are preferably removably or foldably mounted, e.g. by swivel assemblies 63, 65 to enable the hooks to be laid against the roof surface 13 during stacking and storage. Means for hand mounting of a stack cap on top a hay stack may comprise two sets of laterally, oppositely positioned downwardly extending receptacles 66, 68 and associated longitudinally extending receptacles 70, 72 longitudinally spaced from each downwardly extending receptacle 66, 68, respectively. In another embodiment, a single longitudinally extending receptacle 71, 73 is provided in spaced relationship from an associated downwardly extending support member 82, 84, respectively. The method of use of receptacles 66, 68, 70, 72 or 71, 73 in association with mounting poles 160 is discussed in detail below. The receptacles 66, 68, 70, 72 or 71, 73 may be conventionally rigidly attached as by bolts, welding, etc. to the lower surface of longitudinal beams 32, 34. The vertical extension of these receptacles below beam members 32, 34 is exaggerated in the drawing for the sake of clarity, however, in actual use, the downward extension of these receptacles is relatively small, e.g. one inch or less, in order to facilitate stacking and storage of a plurality of stack caps 10.

Figure 14:
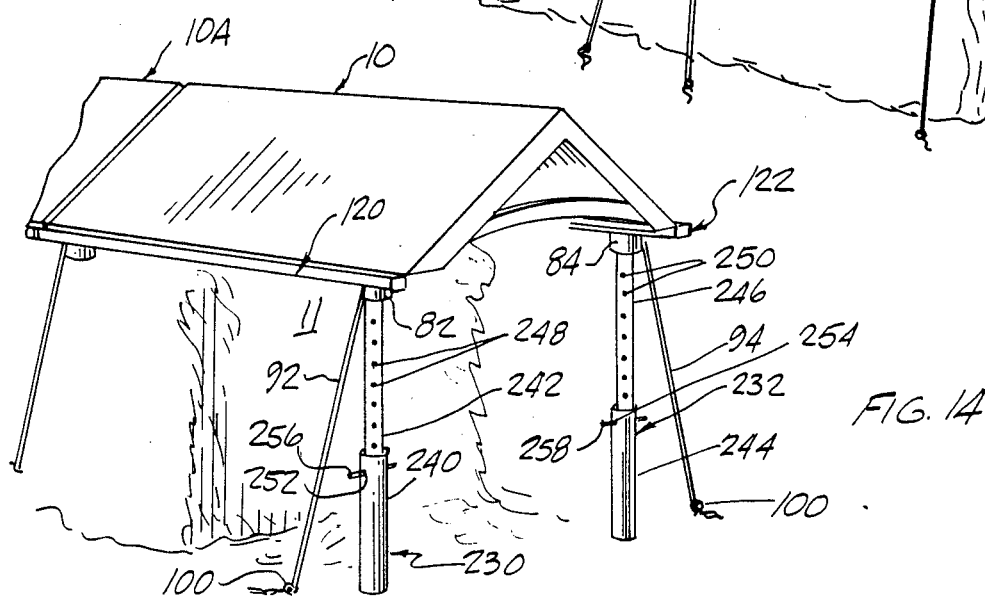
FIG. 14 is a schematic illustration showing the use of telescoping support poles to support a portion of a stack cap above a removed portion of a crop stack.
Figure 15:
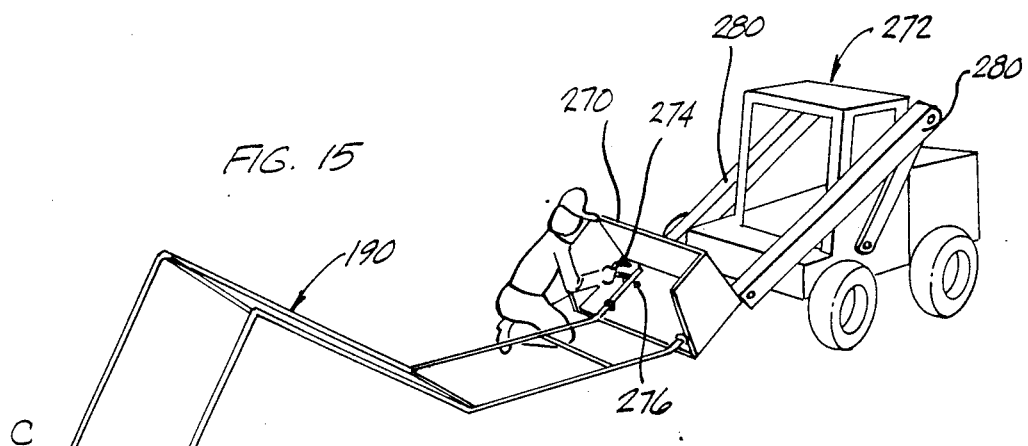
FIG. 15 is a schematic illustration showing the attachment of a bracket assembly of the type illustrated in FIG. 7 to a bucket assembly of a conventional front end loader.
Figure 16:
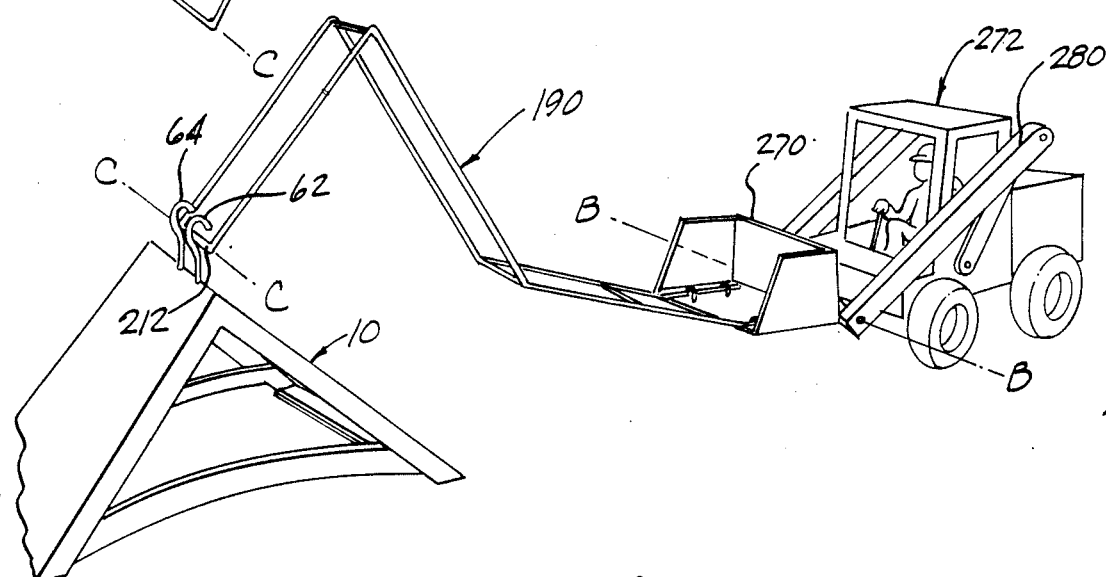
FIG. 16 is a schematic illustration showing the use of a bracket assembly mounted on the bucket assembly of a front end loader to engage a stack cap.
Figure 17:
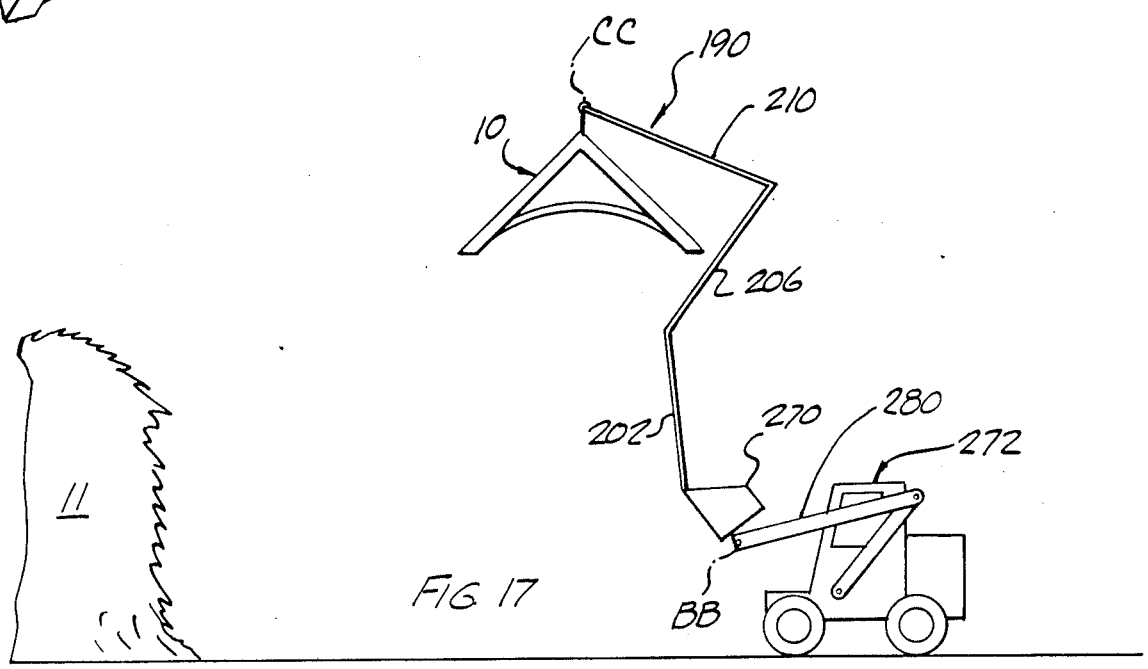
FIG. 17 is a schematic illustration showing the use of a bracket assembly and front end loader to raise a stack cap.

Alternate support means may be provided on a stack cap 10 to enable the stack cap to be stably supported above a hay stack from which hay is being removed, as illustrated in FIG. 14. The alternate support means may comprise downwardly extending support sockets 82, 84, 86, 88 mounted at corner portions of the roof structure and which may be affixed to lower surfaces of longitudinally extending beams 32, 34 by conventional attachment means. The downward extension of the support sockets is somewhat exaggerated in the drawing for the purpose of clarity. In a preferred embodiment, the downward extension of the support sockets may be on the order of one inch or less to facilitate stacking of the stack caps. The use of the downwardly extending support sockets 82, 84, 86, 88 in association with support poles 230, 232, is discussed in further detail below.

Securing means such as a plurality of lines 92, 94, 96, 98 attached to peripheral portions of the stack cap 10 as by eyelet portions 93, 95, 97, 99 provided on members 82, 84, 86, 88 may be attached either directly to a lower portion of the hay stack or to the ground at the base of the hay stack as by pointed anchor stakes 100, secured at the end of each line.

Figure 13:
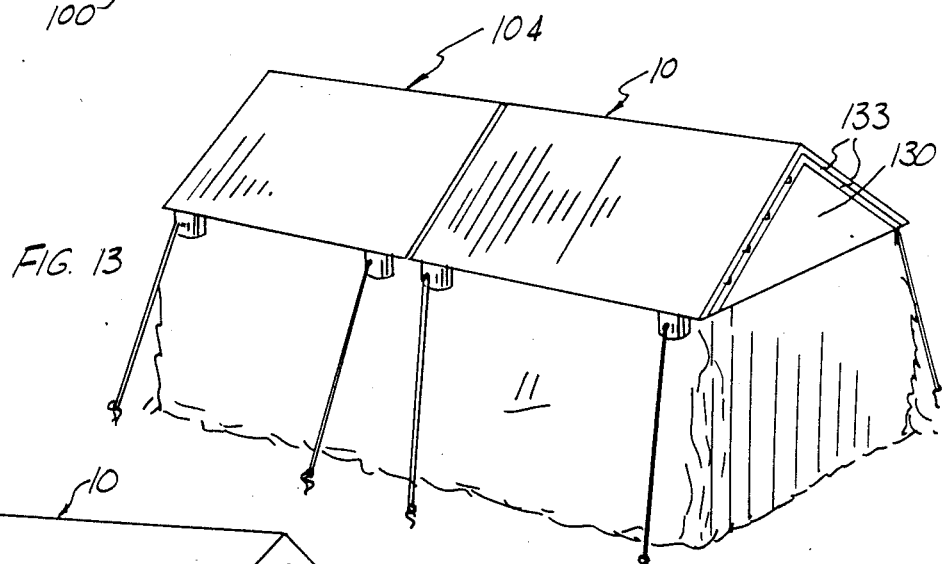
FIG. 13 is a schematic illustration showing the connection of two stack caps on top an elongated crop stack.

Sealingly connectable lip means such as forward lip 110 and rear lip 116 may be fixedly provided on the front and back edges of roof structure 12 for connecting adjacent end portions of a plurality of stack caps 10, 10A to form a continuous covered enclosure of the type illustrated in FIG. 13. As illustrated, in FIG. 4, first V-shaped lip 110 may comprise a downwardly extending flange 112 and an upwardly extending flange 114 connected in a V-shaped configuration and adapted to accept second lip 116 consisting of a single downwardly extending flange 118 mounted on an adjacent stack cap.

Wind deflection means such as wind wings 130, FIG. 13 (only one shown), may be mounted at forward and rear end portions of a roof cap or a plurality of connected roof caps in order to reduce interior wind loading which may tend to lift the stack cap off an associated stack 11. The wind wings are preferably removably mounted as by a plurality of hooks 133 fixedly mounted on forward and rear edge portions 20, 22 of a roof structure which are adapted to engage slots or other hook receiving means in associated wind wing members 130, etc.

Figure 8:
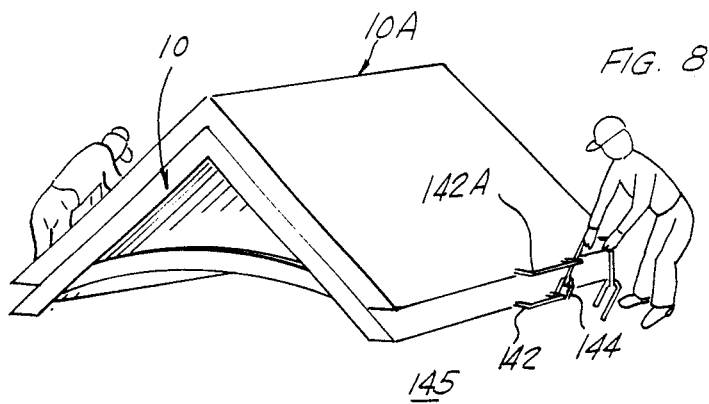
FIG. 8 is a schematic illustration of a stack cap anchored to a loading yard.
Figure 9:
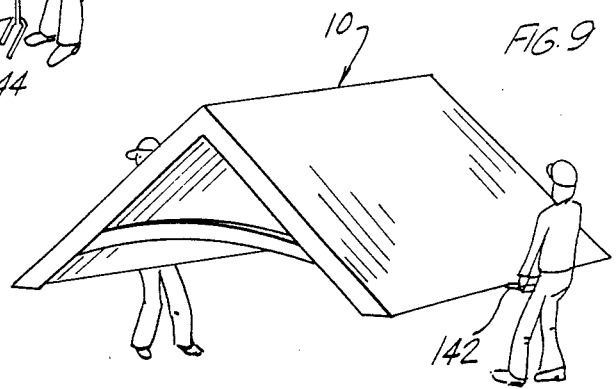
FIG. 9 is a schematic illustration of a stack cap being hand carried by two workers.

Carrying and anchoring means such as handles 140, 142, FIGS. 1, 8 and 9, may be fixedly mounted at laterally opposite intermediate portions of the roof structure 12 to enable a stack cap 10 to be anchored either singly or in stacked form to the ground surface 145 as by ground anchor 144, FIG. 8. The carrying and anchoring means also enables a pair of workers grasping the handles 140, 142 to manually transport the stack cap 10, FIG. 9.

As illustrated in FIG. 6 and 10-12, a manual mounting means, in addition to receptacles 66, 68, 70, 72 or 71, 73, may comprise a pair of telescoping mounting poles 160. Each mounting pole 160 may comprise a tubular handle member 162 adapted to slidingly receive an extension member 164. The members 162, 164 are provided with locking means for holding the extension member at a fixed extension with respect to the handle member. The locking means may comprise a plurality of pin holes 166 in the extension member which are adapted to be aligned with a single pin hole 168 in the handle member and, thereafter, locked into position through a pin 170 which may be attached to the handle member as by a chain 172. Each telescoping pole 160 also comprises a transverse member 174 fixedly attached to the end of the extension member and, in turn, having a vertically extending prong 176 at one end thereof and a longitudinally extending prong 178 connected to the other end thereof as by a spacer portion 180. Vertically extending prong 176 is adapted to be slidingly received within an associated vertically extending receptacle 66, 68 and longitudinally extending prong 178 is adapted to be slidingly received within a longitudinally extending receptacle 70, 72. In an alternate embodiment, longitudinally extending prong 178 is received within longitudinally extending receptacle 71, 73 and vertically extending prong 176 is received within an associated vertically extending support socket 82, 84. The sockets 66, 68, 70, 72 and the prongs and the prong portions 176, 178 are constructed and arranged such that a longitudinally extending prong 178 may first be inserted in an associated longitudinally extending socket and, thereafter, a vertically extending prong 176 may be pivotally, slidingly moved into associated vertically extending socket, FIG. 10.

Figure 7:
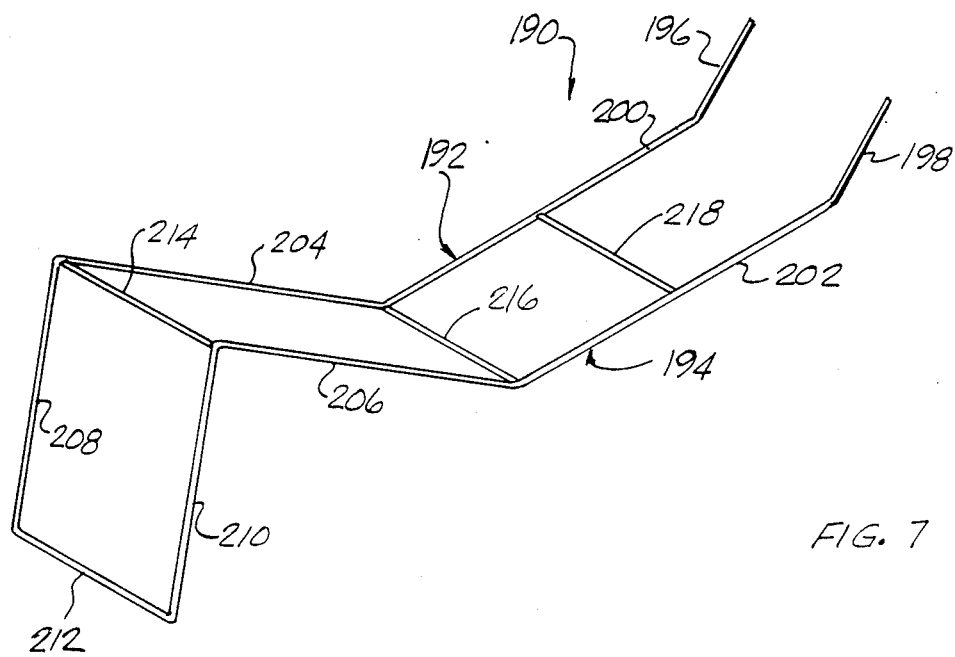
FIG. 7 is a perspective view of a bracket assembly mountable on a front end loader bucket assembly for mechanized mounting of a stack cap of the type illustrated in FIG. 1, on top a crop stack.

A mechanical mounting means, in addition to roof hooks 62, 64, may comprise a loader bracket 190. The loader bracket 190, as illustrated in FIG. 7, may comprise a pair of parallel longitudinally extending portions 192, 194 of identical shape, each comprising a relatively short length attachment portion 196, 198 (e.g. approximately two feet in length), a relatively longer length spacer portion 200, 202 (e.g. approximately three feet in length), a relief bend portion which may comprise a V-shaped portion including a first straight length portion 204, 206 (e.g. five feet in length) and a second straight length portion 208, 210 (e.g. five feet in length). Connected at a terminal end of the relief bend portions is a transverse cap hook engaging member which may comprise transverse member 212 (e.g. five feet in length) connecting terminal ends of members 208, 210. In addition, various structural support members such as transverse members 214, 216, 218 may be fixedly attached to longitudinally extending portions 192, 194 to provide structural support to the bracket assembly.

Stack cap alternate support means in addition to downwardly extending receptacles 82, 84, 86, 88 may comprise a plurality of support members such as telescoping support members 230, 232, FIG. 14, each comprising a receiving member 240, 244 and an extension member 242, 246 having a plurality of holes 248, 250 therein adapted to be aligned with a hole 252, 254 in the handle member and locked into position with an associated pin 256, 258. The support members 230, 232 are adapted to be received within downwardly extending socket members 82, 84, 86, 88 and may thus be used to support an end portion of a cap 10 when a portion of the stack upon which it is mounted has been removed as illustrated in FIG. 14.

Figure 10:
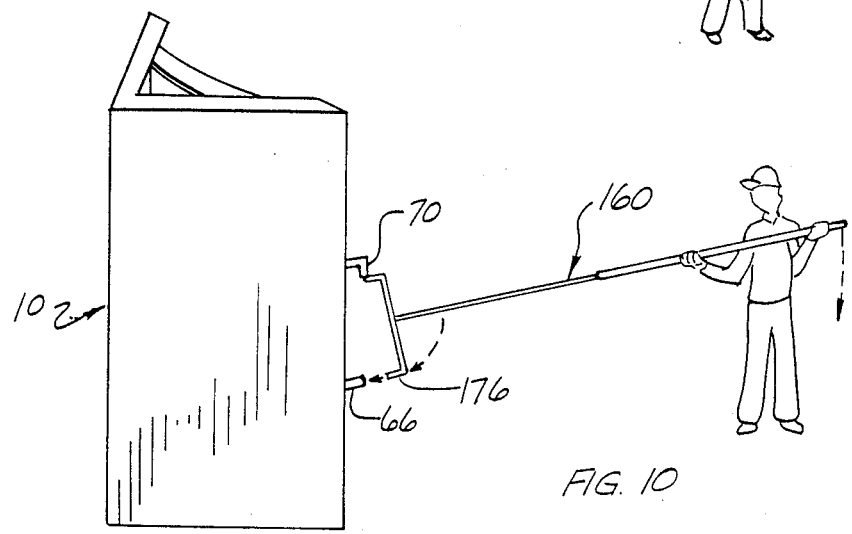
FIG. 10 is a schematic illustration showing the attachment of a telescoping mounting pole of the type illustrated in FIG. 6 with a stack cap.
Figure 12:
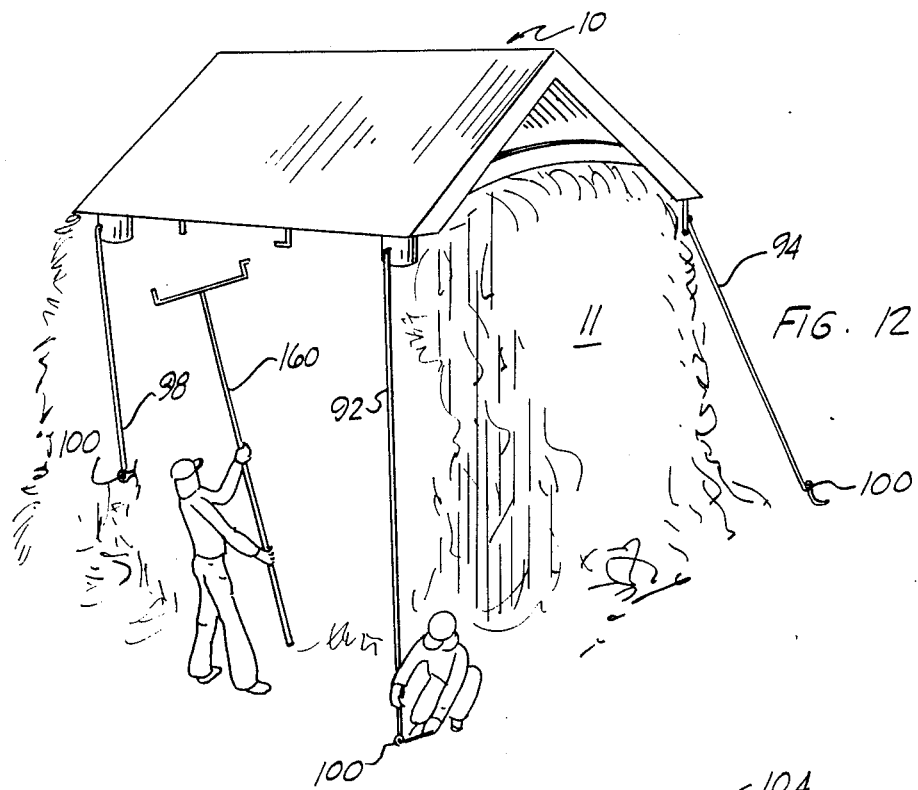
FIG. 12 is a schematic illustration showing the removal of a telescoping mounting pole from a stack cap and the securing of the stack cap in position on top a crop stack.

The method of use of the invention will now be described with reference to FIGS. 8-18. Initially, one or more stack caps 10, 10A may be secured in a fixed storage location such as the ground 145 of a stack yard through anchor means 144 driven into the ground in engaging relationship with handle portions 140, 142, 142A, etc. When it is desired to mount the stack cap on an associated stack 11, first the anchor devices 144 are removed, as illustrated in FIG. 8. Next, the stack cap 10 may be manually transported to the vicinity of a stack by two workers manually carrying the cap by the handle portions, FIG. 9. Next, as illustrated in FIG. 10, the stack cap is positioned on end and a worker after selecting an appropriate length for telescoping pole 160, engages an associated pair of vertically and longitudinally extending receptacles, e.g. 66, 70 on the stack cap with vertically and longitudinally extending prong portions 176, 178 of the support pole 160. The same procedure is repeated with a second support pole 160 on the opposite lateral side of the stack cap. Next, as illustrated in FIG. 11, a pair of workers simultaneously pivot the mounting poles 160 upwardly about a substantially common horizontal axis AA passing through lower portions of each pole. Thereafter, the stack cap 10 is moved to a desired position above the hay stack 11 and is lowered into a desired position onto the stack as illustrated in FIG. 12. As further illustrated in FIG. 12, the mounting poles 160 are disengaged from the associated receptacles through appropriate sliding and pivotal movement thereof and the stack cap is secured in position through the use of lines 92, 94, 96, 98 attached to anchors 100 which are, in turn, driven either into the ground or a lower portion of the stack. The same method may be used to mount a second stack cap 10A in adjacent relationship to a first cap 10 with lip portions thereof attached in locking relationship as described above with reference to FIG. 4. Thereafter, as further illustrated in FIG. 13, wind wings 130 (only one shown) may be attached to both end portions of the continuous stack cap mounting system 10, 10A as by connecting hooks 133. Gutters 120, 122 for deflecting runoff from the stack cap 10 may be mounted thereon either before mounting of the stack cap on an associated crop stack 11 or subsequent to mounting on the stack cap 11, as illustrated in FIG. 14. As further illustrated in FIG. 14, one end portion of the stack cap may be supported by telescoping support poles 230, 232 received within associated sockets 82, 84 mounted on the stack cap. In this manner the stack cap 10 may be stably supported as the stack 11 therebelow is broken away and removed for feeding of livestock.

Figure 18:
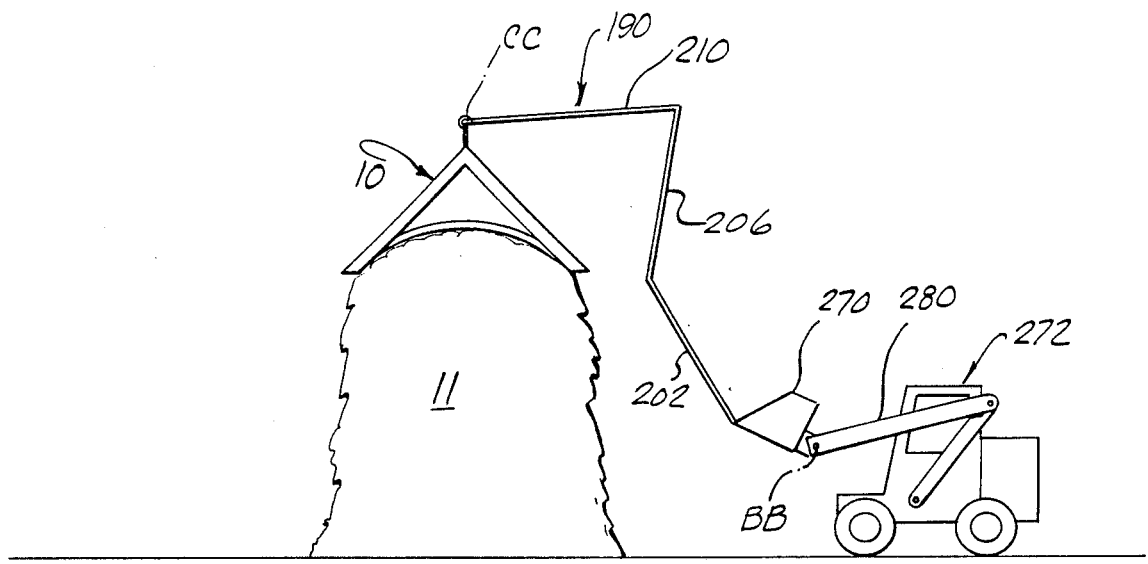
FIG. 18 is a schematic illustration showing the use of a bracket assembly and front end loader to position a stack cap on top a crop stack.

In another method of using the stack cap, a bracket assembly 190, such as described with reference to FIG. 7, may be fixedly mounted in longitudinally extending relationship from the bucket assembly 270 of a conventional front end loader 272 or the like. The bracket 190 may be conventionally attached as by U bolts 274 received within associated hole portions 276 of the bucket assembly, FIG. 15. After mounting of the bracket assembly 190, the loader operator moves the bracket assembly 190 into position immediately below the stack cap mounting hooks 62, 64, FIG. 16. Thereafter, the stack cap may be elevated through raising of the bucket assembly 270 with the front end loader loading arms 280 and primarily by pivotal movement of the bucket assembly 270 about the bucket horizontal pivot axis BB. It may be seen from FIG. 17 that the relief bend portion 206, 210, etc. of the bracket assembly is adapted to allow clearance for providing free pivotal movement between the bracket assembly 190 and the stack cap 10 about a horizontal axis CC defined by transverse member 212. Thereafter, as illustrated in FIG. 18, the front end loader is driven to a position whereat the stack cap is positioned above a stack to be covered and thereafter, the stack cap 10 is lowered into position on the stack, again, primarily through pivotal rotation of bucket assembly 270 about axis BB and, if desired, through lowering of loader arm assembly 280. Thereafter, the bracket assembly 190 may be further lowered and the front end loader 272 may be backed away from the hay stack to complete disengagement from the stack cap. The stack cap may thereafter be secured to the hay stack or connected with other stack caps, etc. in the same manner as described above with reference to FIGS. 12-14.

It is contemplated that the inventive concepts herein described may be variously otherwise embodied and it is intended that the appended claims be construed to include alternative embodiments of the invention except insofar as limited by the prior art.

What is claimed is:

1. A field crop stack covering system for protecting stacked field crops such as hay from moisture and adapted for rapid mounting in an assembled state on an associated stack, comprising:
 (a) an inserted V-shaped roof structure including a pair of generally planar roof panels integrally connected along a longitudinally extending roof peak line defining the top of said roof structure; said roof structure having an inverted V-shaped front edge, an inverted V-shaped back edge and a pair of parallel longitudinally extending side edges terminating in four roof corners and defining the bottom of said roof structure; said roof structure having an exterior surface and an interior surface;
 (b) a first transversely extending beam attached at opposite ends thereof to laterally opposite lower portions of said first and second roof panels proximate said front edge of said roof structure and a second transversely extending beam attached at opposite ends thereof to laterally opposite lower portions of said first and second roof panels proximate said back edge of said roof structure; said first and second transversely extending beams being of substantially identical size and shape and being of an arcuate, downwardly concave configuration having a radius of curvature at least as small as an associated radius of curvature of an associated upper portion of a stack to be covered and being adapted to engage said associated upper portion of a stack, whereby said roof structure is positioned in spaced relationship from said stack, whereby air circulation about said upper portion of said stack is facilitated;
 (c) stack mounting means for raising said inverted V-shaped roof structure in an assembled state onto the top of a stack;
 (d) securing means for securing said roof structure to a stack;
 (e) alternate support means for selectively supporting an end portion of said roof structure above a removed portion of a covered stack.

2. The invention of claim 1 wherein said first and second transversely extending beams are selectively removably attached to said roof structure and wherein said first and second transversely extending beams comprise the only transversely extending members attached between said roof panels whereby said roof structure is readily stackable in a relatively small space atop other identical roof structures when said transversely extending beams are removed therefrom.

3. The invention of claim 1 wherein said stack mounting means comprises:
 socket means positioned on laterally opposite longitudinally intermediate peripheral portions of said stack covering system and pole means adapted to be readily insertable in and removable from said socket means.

4. The invention of claim 1 wherein said stack mounting means comprises:
 a pair of parallel longitudinally extending beams fixedly attached to opposite lower, interior portions of said first and second roof panels and connectable at end portions thereof with end portions of said transversely extending beams;

a first pair of mounting pole receiving receptacles mounted on one of said longitudinally extending beams at an intermediate portion thereof and a second pair of mounting pole receiving receptacles mounted on the other of said longitudinally extending beams at an intermediate portion thereof; each pair of receptacles having a first generally longitudinally extending opening and a second generally vertically extending opening therein adapted to slidingly and pivotally engagably accept a longitudinally extending prong portion and a vertically extending prong portion of a mounting pole; and telescopingly extendable and lockable mounting poles adapted to be engaged by said mounting pole receiving receptacles; said roof structure being engagable by a pair of said mounting poles; raisable onto a stack with said mounting poles and disengagable from said mounting poles, by selected pivotal movements of said mounting poles.

5. The invention of claim 1 wherein said stack mounting means comprises:

at least two downwardly opening roof hooks mounted on an upper portion of said roof structure and adapted to selectively engage and disengage from an elongate raising bar portion of a front end loader mountable bracket assembly; and a front end loader mountable bracket assembly adapted to be received by said downwardly opening roof hooks whereby said roof structure is engagable and raisable or lowerable with respect to a stack through selected pivotal movement of a bucket assembly of a front end loader on which said bracket assembly is mounted; said bracket assembly having a substantially straight relatively long spacer portion for providing a relatively large vertical displacement of said roof structure in response to pivotal movement of the bucket assembly and having a roof hook engagement portion for engaging the roof hooks and having a relief bend portion between said hook engagement portion and said spacer portion for providing clearance between said bracket assembly and said roof structure as said roof structure is raised by said bracket assembly.

6. The invention of claim 1 wherein said alternate support means comprises:

end support pole sockets provided proximate said four corner portions of said roof structure for selectively receiving support poles therein;

telescopingly extendable and lockable support poles receivable in said end support pole sockets for supporting one end portion of said roof structure when a portion of a covered stack is removed from below one transversely extending beam of said roof structure.

7. A field crop stack covering system for protecting stacked field crops such as hay from moisture adapted for rapid mounting in an assembled state on an associated stack, comprising:

(a) an inverted V-shaped roof structure including a pair of generally planar roof panels integrally connected along a longitudinally extending roof peak line defining the top of said roof structure; said roof structure having an inverted V-shaped front edge, an inverted V-shaped back edge and a pair of parallel longitudinally extending lower side edges terminating in four roof corners and defining the bottom of said roof structure; said roof structure having an exterior surface and an interior surface;

(b) a first, V-shaped lip portion mounted on said front edge of said roof structure and being substantially co-extensive therewith and a second, downwardly extending lip portion mounted on said back edge of said roof structure and being substantially co-extensive therewith, said first lip portion being adapted to interlock with structure on an adjacently positioned roof structure which is substantially identical to said second lip portion for forming a watertight seal therewith;

(c) a first transversely extending beam selectively removably attached at opposite ends thereof to laterally opposite lower portions of said first and second roof panels proximate said front edge of said roof structure and a second transversely extending beam selectively removably attached at opposite ends thereof to laterally opposite lower portions of said first and second roof panels proximate said back edge of said roof structure; said first and second transversely extending beams being of substantially identical size and shape and being of an arcuate, downwardly concave configuration having a radius of curvature at least as small as an associated radius of curvature of an associated upper portion of a stack to be covered and being adapted to engage said associated upper portion of a stack, whereby said roof structure is positioned in spaced relationship from said stack, whereby air circulation about said upper portion of said stack is facilitated;

(d) a pair of parallel longitudinally extending beams fixedly attached to opposite lower, interior portions of said first and second roof panels and connectable at end portions thereof with end portions of said transversely extending beams;

(e) a first pair of mounting pole receiving receptacles mounted on one of said longitudinally extending beams at an intermediate portion thereof and a second pair of mounting pole receiving receptacles mounted on the other of said longitudinally extending beams at an intermediate portion thereof; each pair of receptacles having a first generally longitudinally extending opening and a second generally vertically extending opening therein adapted to slidingly and pivotally engagably accept a longitudinally extending prong portion and a vertically extending prong portion of a mounting pole;

(f) at least two downwardly opening roof hooks mounted on an upper portion of said roof structure and adapted to selectively engage and disengage from an elongate raising bar portion of a front end loader mountable bracket structure;

(g) end support pole sockets provided proximate said four corner portions of said roof structure for selectively receiving support poles therein;

(h) tie down assemblies comprising individual lines attached proximate said four corners of said roof structure and anchor devices securable to the stack and attached to terminal end portions of said lines;

(i) laterally extending handles mounted proximate the longitudinal centers of said lower side edges of said roof structure whereby said roof structure is hand carriable by two men using said handles and is storingly securable to the ground using ground anchor devices driven into the ground and engaging said handles;

(j) gutter assemblies selectively mountable on said side edges of said roof structure and adapted to carry rain water away from an associated stack of crops;

(k) wind wings selectively attachable proximate said front and back edges of said roof structure in downwardly extending relationship therefrom and being constructed and arranged to enclose open front and back portions of said roof structure defined by said front and back edges whereby wind loading on said interior surface of said roof structure is reduced;

(l) telescopingly extendable and lockable mounting poles adapted to be engaged by said mounting pole receiving receptacles; said roof structure being engagable by a pair of said mounting poles; raisable onto a stack with said mounting poles and disengagable from said mounting poles, by selected pivotal movements of said mounting poles;

(m) telescopingly extendable and lockable support poles receivable in said end support pole sockets for supporting one end portion of said roof structure when a portion of a covered stack is removed from below one transversely extending beam of said roof structure;

(n) a front end loader mountable bracket assembly adapted to be received by said downwardly opening roof hooks whereby said roof structure is engagable and raisable or lowerable with respect to a stack through selected pivotal movement of a bucket assembly of a front end loader on which said bracket assembly is mounted; said bracket assembly having a substantially straight relatively long spacer portion for providing a relatively large vertical displacement of said roof structure in response to pivotal movement of the bucket assembly and having a roof hook engagement portion for engaging the roof hooks and having a relief bend portion between said hook engagement portion and said spacer portion for providing clearance between said bracket assembly and said roof structure as said roof structure is raised by said bracket assembly.

* * * * *